United States Patent
Kokott et al.

(10) Patent No.: US 8,720,654 B2
(45) Date of Patent: May 13, 2014

(54) BRAKE DISC POT FOR MOTOR VEHICLES

(75) Inventors: Kordian Kokott, Munich (DE); Tabea Nillert, Heidesee (DE); Ulrich Kuhn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 252 days.

(21) Appl. No.: 13/237,420

(22) Filed: Sep. 20, 2011

(65) Prior Publication Data

US 2012/0037467 A1 Feb. 16, 2012

Related U.S. Application Data

(63) Continuation of application No. PCT/EP2010/001920, filed on Mar. 26, 2010.

(30) Foreign Application Priority Data

Apr. 9, 2009 (DE) .......................... 10 2009 017 233
Apr. 9, 2009 (DE) .......................... 10 2009 017 234

(51) Int. Cl.
*F16D 65/12* (2006.01)

(52) U.S. Cl.
USPC .................................................. 188/218 XL

(58) Field of Classification Search
USPC .............. 188/17, 18 R, 18 A, 218 XL, 264 A
See application file for complete search history.

(56) References Cited

U.S. PATENT DOCUMENTS

| 6,666,303 | B2 | 12/2003 | Torii et al. |
| 2002/0139622 | A1* | 10/2002 | Chen ........................ 188/218 XL |
| 2004/0134720 | A1* | 7/2004 | Niebling et al. ............ 188/18 A |
| 2005/0126870 | A1 | 6/2005 | Doppling et al. |
| 2006/0175161 | A1* | 8/2006 | Gripemark et al. ...... 188/218 XL |
| 2007/0193837 | A1* | 8/2007 | Lamb ....................... 188/218 XL |
| 2009/0020379 | A1* | 1/2009 | Hanna et al. ............ 188/218 XL |

FOREIGN PATENT DOCUMENTS

| DE | 1 800 549 | 5/1970 |
| DE | 2 101 428 | 10/1971 |
| DE | 31 15 260 A1 | 4/1982 |
| DE | 31 07 124 A1 | 9/1982 |
| DE | 87 02 630.9 U1 | 7/1987 |
| DE | 196 48 582 A1 | 5/1998 |
| DE | 196 52 464 A1 | 6/1998 |
| DE | 199 43 893 A1 | 3/2001 |
| DE | 100 24 819 A1 | 11/2001 |
| DE | 101 32 429 A1 | 2/2002 |
| DE | 101 33 985 A1 | 10/2002 |
| DE | 202 19 859 U1 | 4/2003 |
| DE | 10 2005 060 440 A1 | 4/2007 |

(Continued)

OTHER PUBLICATIONS

German Search Report dated Oct. 12, 2010 including partial English-language translation (Nine (9) pages).

(Continued)

*Primary Examiner* — Christopher Schwartz
(74) *Attorney, Agent, or Firm* — Crowell & Moring LLP (57) ABSTRACT

A brake disc pot for a motor vehicle disc brake having one or two brake discs includes a device for the centered attachment of the brake disc and a device for guiding cooling air in the radial direction toward the brake disc. The brake disc pot has recesses on its periphery.

20 Claims, 5 Drawing Sheets

(56) References Cited

FOREIGN PATENT DOCUMENTS

| DE | 10 2006 052 177 A1 | 5/2008 |
| DE | 10 2008 016 037 A1 | 11/2008 |
| FR | 2 797 929 A1 | 3/2001 |
| GB | 1 333 561 | 10/1973 |
| GB | 2 074 264 A | 10/1981 |
| GB | 2 093 936 A | 9/1982 |

OTHER PUBLICATIONS

German Search Report dated Nov. 30, 2010 including partial English-language translation (Nine (9) pages).
International Search Report dated Jun. 29, 2010 including English-language translation (Four (4) pages).

* cited by examiner

BRAKE DISC POT FOR MOTOR VEHICLES

CROSS-REFERENCE TO RELATED APPLICATIONS

This application is a continuation of PCT International Application No. PCT/EP2010/001920, filed Mar. 26, 2010, which claims priority under 35 U.S.C. §119 from German Patent Application Nos. DE 10 2009 017 233.5, filed Apr. 9, 2009, and DE 10 2009 017 234.3, filed Apr. 9, 2009, the entire disclosures of which are herein expressly incorporated by reference.

BACKGROUND AND SUMMARY OF THE INVENTION

The invention relates to a brake disc pot for a disc brake of a motor vehicle.

A conventional wheel and its bearing is constructed of the wheel bearing component, the wheel hub component having a wheel mounting flange and a rim component with the tire. The rim is fastened to the wheel mounting flange by means of tire bolts. The brake disc is clamped between the rim and the wheel mounting flange by way of a brake disc pot. Such a wheel bearing arrangement is described in German Patent document DE 101 32 429 A1. The maximal brake disc friction radius is determined here by the chain of measurements of internal rim radius minus height of the caliper bridge minus half the lining height. In the case of high-powered vehicles, it is therefore often necessary to use a larger rim in order to accommodate the required brake disc size.

Furthermore, composite brake discs are known, with a friction ring made of gray cast iron, connected with a brake disc pot made of light metal. German Patent document DE 100 24 819 A1 describes, among others, so-called built-up brakes discs, where the friction ring and the pot are joined by means of separate elements, such as pins, screws, etc. In this case, the brake disc pot has a bottom and a surrounding wall and is made of an aluminum alloy.

A wheel with a double brake disc and its bearing are constructed of the wheel bearing component, the wheel hub component with the wheel mounting flange and of a rim component with the tire. The rim is fastened to the wheel mounting flange by means of wheel bolts, in which case the double brake disc is clamped by way of a brake disc pot between the rim and the wheel mounting flange. A wheel bearing arrangement of this type is described in German Patent document DE 10 2006 052 177 A1.

A further double brake disc is described in German Published Patent Application DE 1 800 549. There, the brake discs are connected directly with the wheel hub, and only a slightly ventilated area is created between the two brake discs, which is not beneficial to the cooling of the brake discs, for example, during a sustained braking.

German Utility Model G 87 02 630.9 describes a construction of a double brake disc provided with cooling, apparently for a wheel assembly with a double disc brake for rail vehicles. As shown in G 87 02 630.9, each brake disc is connected in one piece by way of arms 21 parallel to the axis with a fastening ring 19, which is held in a centered manner on the axle shaft by a supporting ring 13. Air can flow through between the arms 21 into the space between the brake discs. In this case, the brake disc has a very complicated construction and its manufacturing is very costly. In addition, the construction is less suitable for a motor vehicle.

It is an object of the present invention to provide wheel assemblies having single-disc brakes or double-disc brakes for a vehicle, which have a brake disc pot that has a weight-saving design, assists the cooling of the brake disc and furthermore avoids the above-mentioned disadvantages.

According to the invention, this and other objects are achieved by a brake disc pot for a disc brake having a device for the centered attachment of at least one brake disc and having a device for guiding cooling air in the radial direction toward the brake disc. The brake disc pot has recesses on its periphery.

According to the invention, a brake disc pot for a disc brake having a device for the centered attachment of at least one brake disc and having a device for guiding cooling air in the radial direction toward the brake disc, particularly into the space between two brake discs, is characterized in that the brake disc pot has recesses on its periphery.

A brake disc pot designed as a "framework" has the advantage that cooling air can flow in the radial direction out of the brake disc pot along the brake disc, which contributes to an effective cooling of the brake disc and of the caliper. In addition, the brake disc pot can be designed in this manner to be light and in filigree, which has significant weight-related advantages without having to accept cutbacks with respect to structural strength. If the brake disc pot has a device for the centered parallel-spaced attachment of two brake discs, air flowing through the space between the two brake discs will meet hardly any resistance but rather will be beneficial, which contributes to an excellent cooling of the brake discs and of the caliper.

In an advantageous embodiment of the invention, the brake disc pot is characterized in that, viewed from the brake disc, this brake disc pot extends essentially in one direction. In this case, the framework ribs or webs may extend perpendicular to the inside diameter of the brake disc pot or may be slightly skewed.

In the case of an embodiment with two brake discs spaced parallel, the brake disc pot extends essentially between the two brake discs.

In a further embodiment, the brake disc, by way of, in particular, six to ten centering and/or attaching projections, is fixed to the brake disc pot by means of attaching devices extending in the axial direction, particularly screws and/or rivets. The centering and/or attaching projections are oriented toward the interior from an inner diameter of the brake disc. The brake disc is guided in the axial direction, on the face, from one side, to the brake disc pot and, placed on centering shoulders of the brake disc pot. If the brake disc and the brake disc pot are parts which can be separated from one another, the manufacturing of each part will be simple and reasonably priced. In addition, an exchange of the brake discs can be carried out without having to remove the entire wheel assembly. In this case, it is an advantage for the brake disc pot to center the brake disc in the radial and axial direction. If the connection is relocated in the direction of the friction rings, instead of being arranged on the outer diameter of the brake disc pot in the axial direction, even more weight can be saved.

In a further preferred embodiment of the invention, the brake disc pot has a frame which forms its periphery and its recesses and consists of an essentially V-shaped, in particular, meandering profile of the same or of a different cross-section. In the case of the double brake disc, the profile may extend essentially in a V-shape from one brake disc to the next. In both cases, a brake disc pot can be designed that constructively is particularly light, with a simultaneously advantageous diffusion of stress in the profile of the frame. This is so, especially if the frame profile, particularly a frame profile of a meandering shape, extends from one brake disc to the next. Furthermore, as a result of the construction, vibrations in opposite directions between the friction rings of the brake discs can be absorbed and compensated. In general, the thermal axial distortion—the shielding—is reduced in that the friction ring is connected in a finger-type manner by way of attaching projections, and the brake disc pot can thereby absorb deformations in the friction ring and can yield to them. A reasonable priced manufacturing is also made possible, for example, by die casting without undercuts in the mold.

The frame profile can advantageously be reinforced by a pot plate which extends in the radial direction. In this case, the frame profile and/or the pot plate may then consist of a light metal alloy and both can advantageously be cast in one operation. The weight is thereby enormously reduced in comparison to gray cast iron material and, in addition, as a result of the lightweight construction of the pot in comparison to the solid-bowl pot. For a design that meets the stress requirements, the transition areas from the frame to the pot plate may be reinforced at least partially by an accumulation of material.

The brake disc mounting is especially facilitated by an embodiment of the invention in which, in the case of the brake disc, on one side, the brake disc centering device and/or the brake disc attaching device and, on the other side, the pot plate is constructed at the frame profile situated on the outside in the axial direction, particularly at the points of the V-base, at the exterior side. In the case of a double disc, the brake disc centering device and/or the brake disc attaching device is constructed at the frame profile situated on the outside in the axial direction, particularly at the points of the V-base, on the exterior side.

While a further advantageous embodiment is characterized in that the ribs of the frame have a cross-sectional profile in the area of the recesses, which is suitable for conveying air, by means of its rotation, from the brake disc pot in the radial direction to the outside through the recesses along the brake disc, into the brake disc, or between the brake discs, the brake disc or brake discs are actively supplied with air for cooling purposes, which cools these brake discs particularly when slowly driving downhill.

The design has a particularly advantageous effect on the conveying of air if the ribs of the frame in the area of the recesses have a cross-sectional profile which has an acute angle, whose vertex, viewed in the rotating direction of the brake disc pot, because of the radiuses used at the cross-sectional corners, is situated in front of the cross-sectional profile, particularly on a tangent at the inside diameter of the brake disc top, and its legs, viewed from the vertex, extend in the direction away from the rotating direction of the brake disc pot. If the cross-sectional profile of the ribs corresponds essentially to a parallelogram, with a vertex of its lower acute corner angle situated in front in the rotating direction of the brake disc pot, particularly essentially on the inner diameter of the brake disc pot, the design is easy to implement with respect to casting. For this purpose, it is also necessary that the ribs of the frame have a cross-sectional profile in the area of the recesses, which cross-sectional profile has rounded edges, particularly constructed as cast radiuses.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
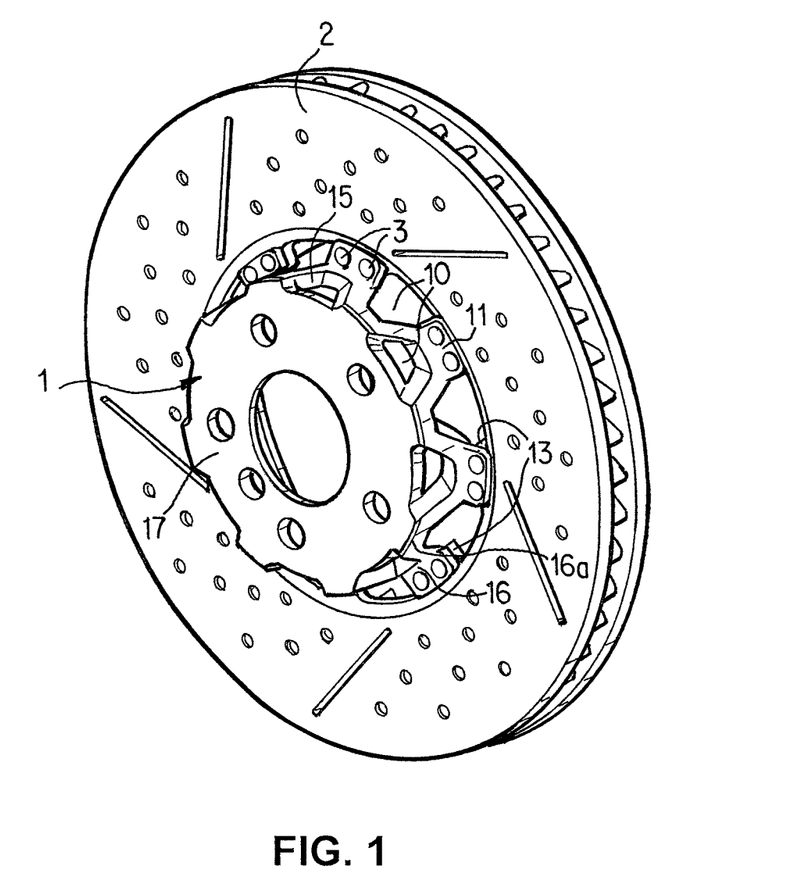
FIG. 1 is a spatial view of a brake disc pot according to the invention of an embodiment having an individual brake disc.

The brake disc pot 1 is assigned to a wheel hub (not shown) and can be rotationally driven around a centrally extending, not shown axle. The brake disc pot 1 is designed in the manner of a framework. The shape is predominantly used for ventilating a brake disc 2 and a caliper (not shown) by way of air flow through the space laterally of the brake disc 2 attached on the front side on the brake disc pot 1 or by way of air flow through the space in the brake disc 2. As a result, it should be sufficiently ensured that temperatures in the area of the brake disc 2 are kept as low as possible and, in particular, the caliper, which is not shown, is cooled.

The recesses 10 in the brake disc pot 1 and the connection geometries to the brake disc 2 are designed such that there are no undercuts and the brake disc pot 1 can therefore easily be produced by casting by using two corresponding mold halves. In addition, the tension-critical corners are shaped such that tension in the material occurring during stress as a result of the braking torque are largely minimized. Furthermore, the lightweight construction is distinguished by structural strength due to the framework-type skeleton construction, and by an enormous weight reduction of approximately 50% in comparison to a conventional solid-bowl pot, which, in addition, saves material costs.

Connecting of the brake disc 2 to the brake disc pot 1 is implemented by rivets 3, but it can also be carried out by a screwed connection or by form-locking connections.

The brake disc 2, by way of eight centering and attaching projections 13 projecting from an inner diameter toward the interior, is guided in the axial direction, on the face, from one side, to the brake disc pot 1 and, placed on the centering projections 11 of the brake disc pot 1. The brake disc 2 is attached to the brake disc pot 1 by way of the rivets 3 extending in the axial direction. The brake disc pot 1 centers the brake disc 2 in the radial and axial direction.

Figure 2:
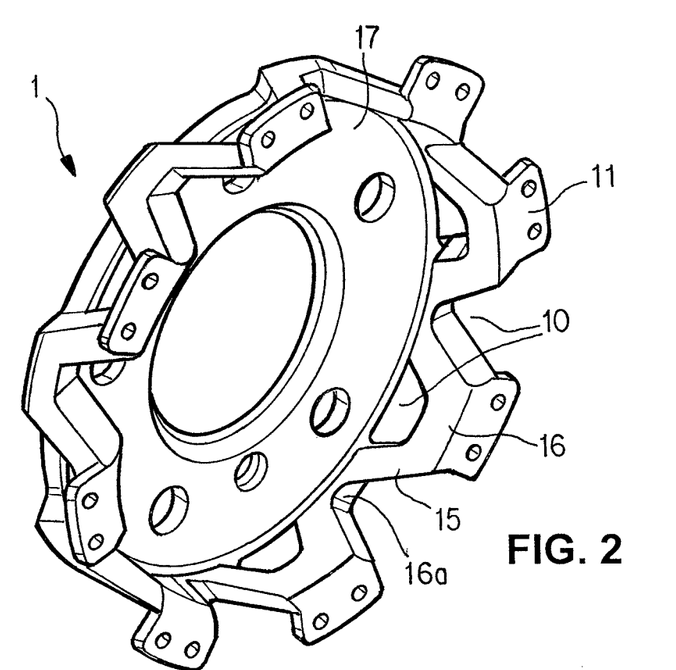
FIGS. 2 and 2a are respective spatial views of a brake disc pot according to the embodiment of FIG. 1.
Figure 2A:
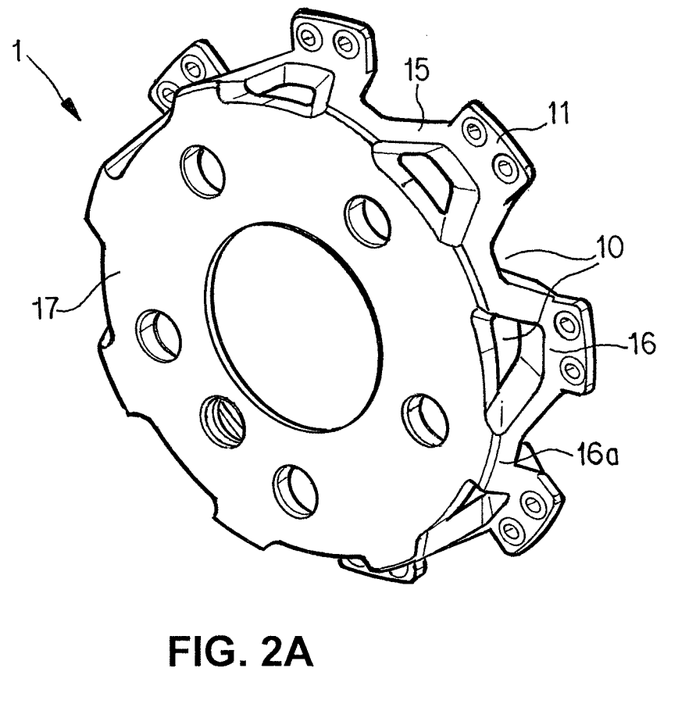

FIG. 2 shows the brake disc pot 1 for a single-disc brake in two spatial views with the device for guiding cooling air in the radial direction along the brake disc 2 (FIG. 1). For this purpose, the brake disc pot 1 has a frame 15, which forms its periphery and its recesses 10 and which consists of a profile of a different cross-section extending essentially in a V-shape. The V-shaped profile of the frame 15 extends from the brake disc 2 axially in one direction in a meandering shape and is reinforced by a pot plate 17 extending in the radial direction. At the profile of the frame 15 situated on the outside in the axial direction, the brake disc centering and attaching device is constructed at the points 16 of the V-base of one side, on the exterior side. The pot plate 17 rests on the points of the V-base 16a of the other side. The profile of the frame 15 and the pot plate 17 are made of a light metal alloy by die casting. The transition areas from the frame 15 to the pot plate 17 may also be reinforced by the accumulation of material.

Figure 3:
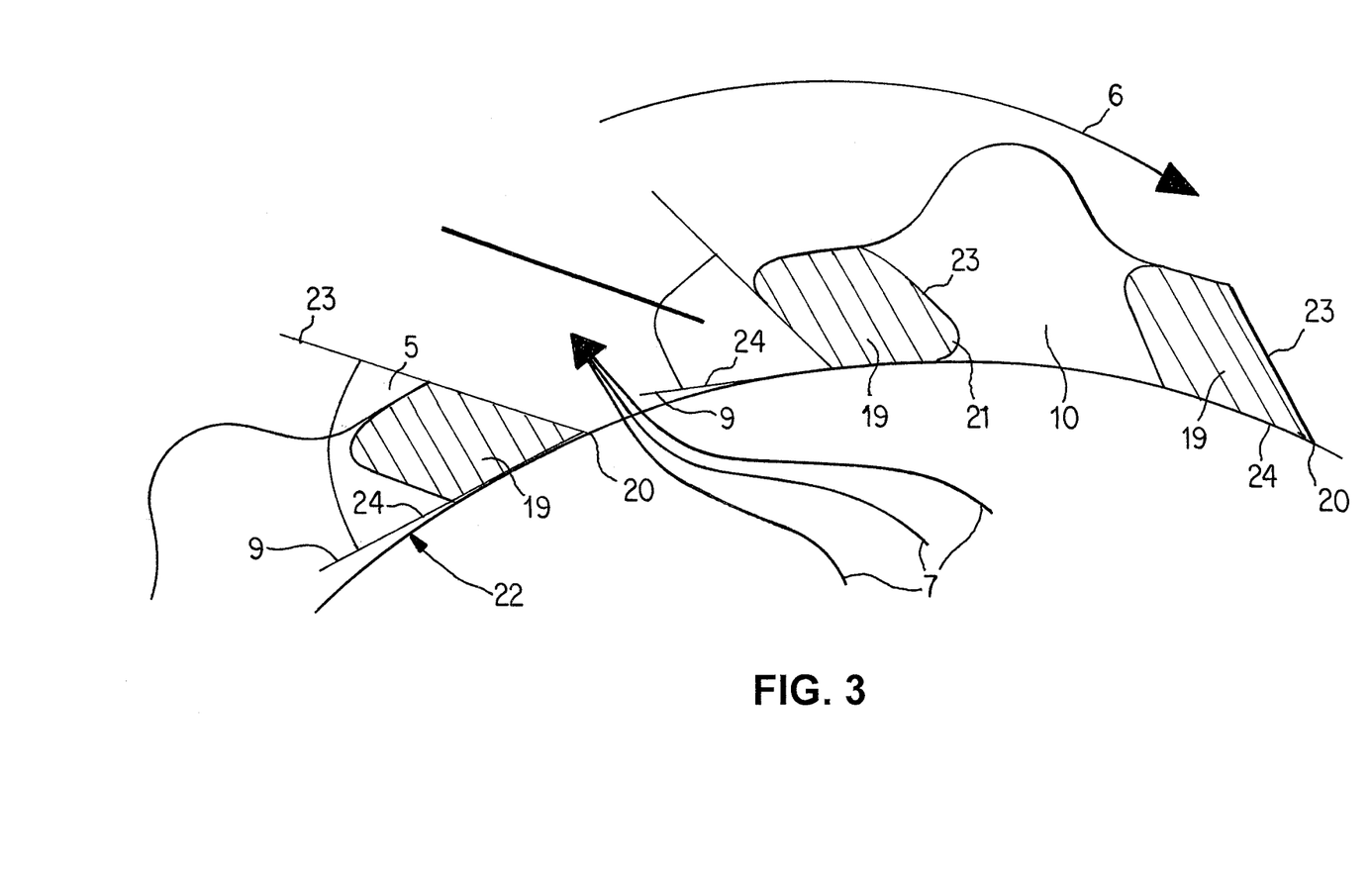
FIG. 3 is a partial cross-sectional view of the frame in the area of individual ribs of the brake disc pot for showing the cooling air flow.

The device for guiding cooling air at the frame 15 is implemented by its cross-sectional profile. As illustrated in FIG. 3, the ribs 19 of the frame 15 have a cross-sectional profile in the area of the recesses 10 for this purpose. This cross-sectional profile is suitable for conveying, by means of its rotation (rotating direction 6), air from the brake disc pot 1 in the radial direction toward the outside (flow arrows 7) through the recesses 10 along the, and into, the brake disc 2 (FIG. 1). The cross-sectional profile has an acute angle 5, whose vertex 20, viewed in the rotating direction 6 of the brake disc pot 1, because of the radiuses used at the cross-sectional corners, is situated in front of the cross-sectional profile on a tangent 9 at the inner diameter of the brake disc—arrow 22—, and whose legs 23, 24, viewed from the vertex 20, extend opposed to the rotation direction 6 of the brake disc pot 1. In the area of the recesses 10, the ribs 19 of the frame 15 therefore have a cross-sectional profile that essentially corresponds to a parallelogram, with the vertex 20 of its lower acute corner angle 5 situated in front in the rotating direction 6 of the brake disc pot 1, essentially on the inner diameter—arrow 22—of the brake disc pot 1.

The ribs 19 are skewed at an angle 5 of approximately 45° with respect to the tangent at the inside brake disc pot diameter—arrows 22. The flowing-in of cooling air—arrows 7—from the interior side of the brake disc pot, in the case of the rotating direction (arrow 6) that corresponds to forward driving, is therefore furthered.

Figure 4:
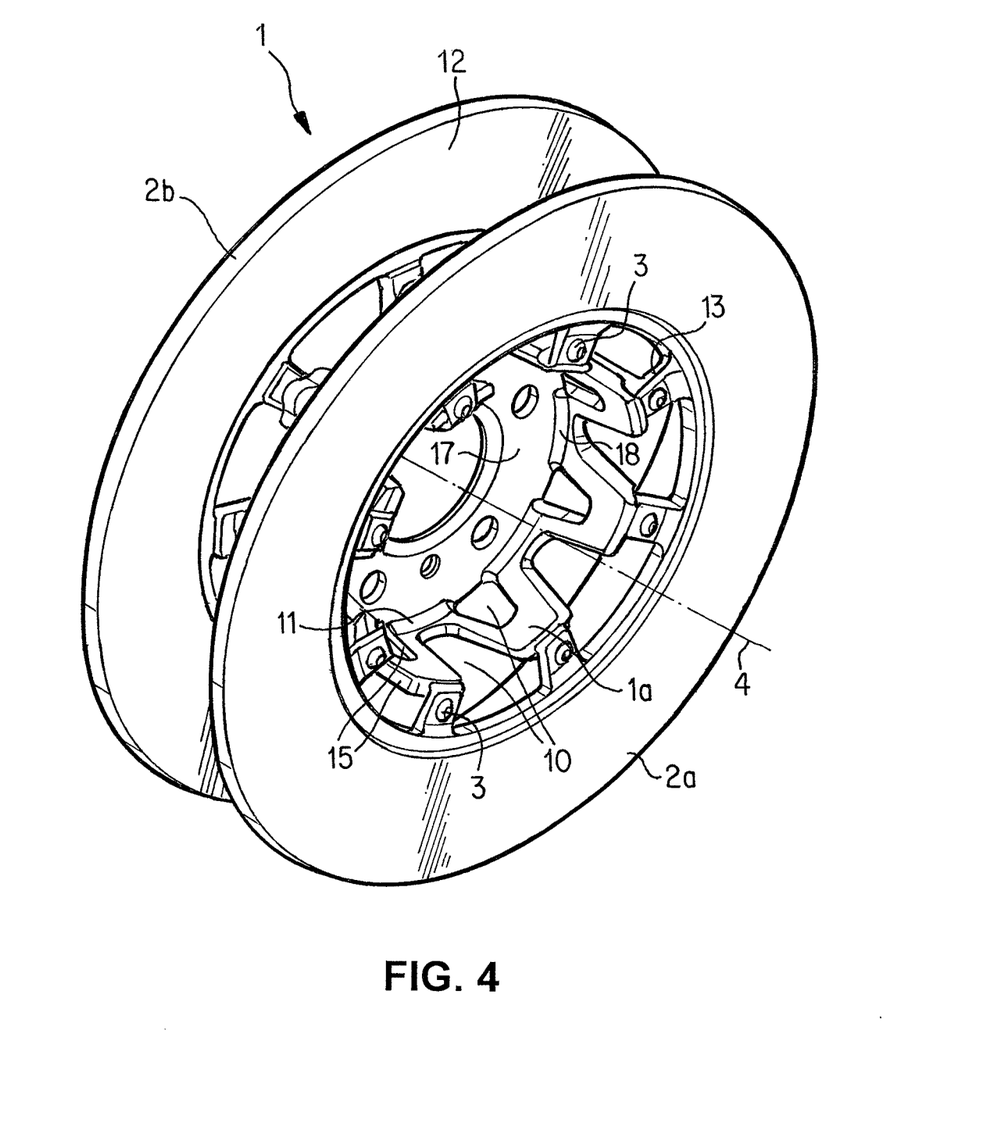
FIG. 4 is a spatial view of the brake disc pot according to the invention of an embodiment with a double brake disc.

The brake disc pot 1a illustrated in the embodiment of FIG. 4 is assigned to a wheel hub (not shown) and can be rotationally driven around an axle 4 illustrated by a broken line. It is designed in the manner of a framework. The shape is predominantly used for ventilation; i.e. the flow through the space 12 between two brake discs 2a, 2b in each case attached on the face to the brake disc pot 1a, is to be sufficiently ensured for keeping temperatures in the area between the brake discs 2a, 2b as low as possible and, in particular, cooling the caliper (not shown).

The recesses 10 in the brake disc pot 1a and the connection geometries to the brake discs 2a, 2b are designed such that no undercuts exist, and thus the brake disc pot 1a can easily be produced by using two corresponding mold halves by die casting. In addition, the tension-critical corners 11 are shaped such that tension in the material occurring as a result of the stress caused by the braking torque are largely minimized. This construction can thereby also compensate opposed vibrations between the brake discs 2a, 2b. Furthermore, this lightweight construction is distinguished by structural strength caused by the framework-type skeleton construction, and by an enormous weight reduction of approximately 50% in comparison to a conventional solid-bowl pot, which, in addition, saves material costs.

The connecting of the brake discs 2a, 2b to the brake disc pot 1a is implemented by a screwed connection 3, but it can also be carried out by riveting or by form-locking connections.

In this case, only the tap holes 1b (FIG. 5) in the brake disc pot 1a require mechanical refinishing.

The brake discs 2a, 2b are guided, by way of eight centering and attaching projections 13 projecting from their inner diameter toward the interior, in the axial direction, on the face, from each side, to the brake disc pot 1a and, placed on the centering projections 1c of the brake disc pot 1a. The brake discs 2a, 2b are attached to the brake disc pot 1a by way of screws 3 extending in the axial direction. The brake disc pot 1a centers the brake discs 2a, 2b in the radial and axial direction.

Figure 5:
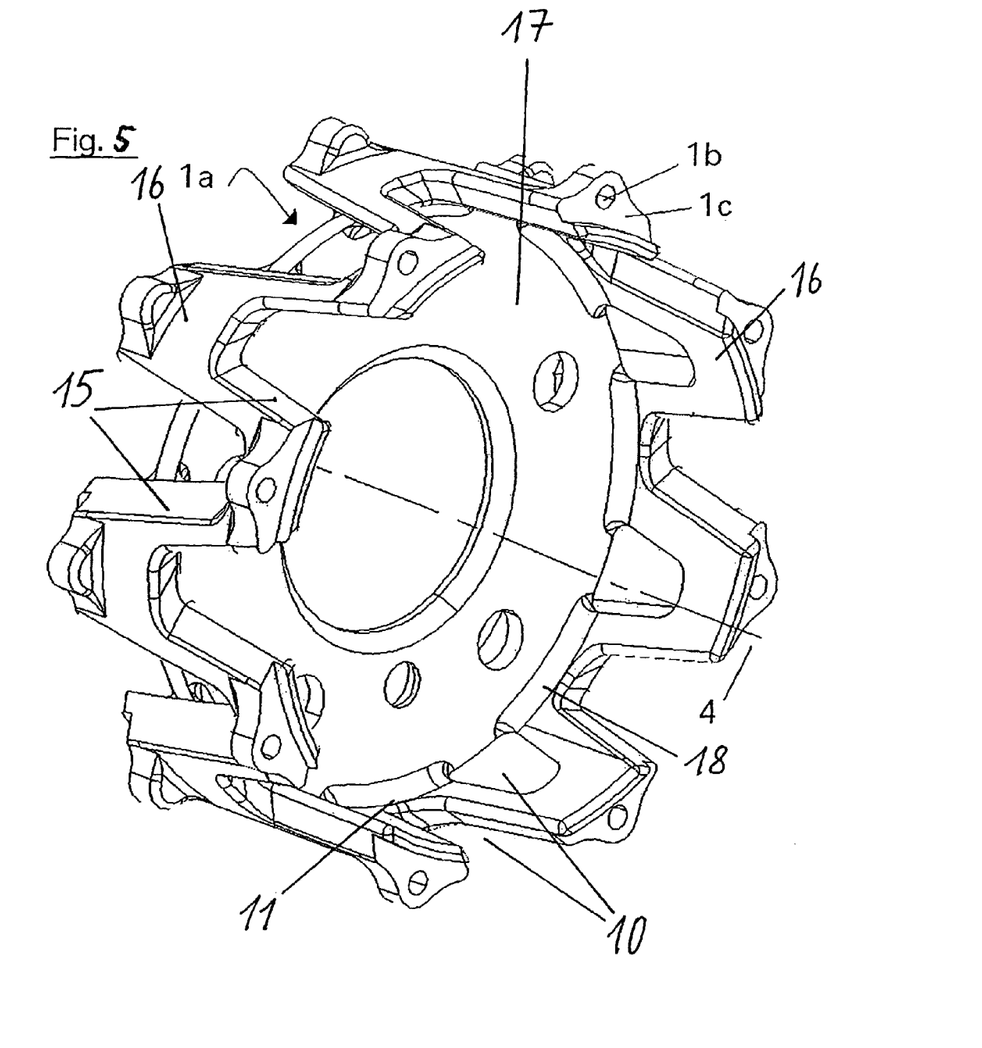
FIG. 5 is a view of the brake disc pot according to the embodiment of FIG. 4 with dismounted brake discs.

FIG. 5 illustrates the brake disc pot 1a for a double-disc brake having the device for the centered parallel-spaced attachment of two brake discs 2a, 2b and having a device for the guiding of cooling air in the radial direction into the space 12 between the two brake discs 2a, 2b (FIG. 4). For this purpose, the brake disc pot 1 has a frame 15, which forms its periphery and its recesses 10 and which consists of a profile of a different cross-section extending essentially in a V-shape. The V-shaped profile of the frame 15 extends from brake disc 2a to brake disc 2b in a meandering shape toward each brake disc 2a, 2b and is reinforced by a pot plate 17 extending in the radial direction. At the profile of the frame situated on the outside in the axial direction, the brake disc centering and attaching device is constructed on each side at the points 16 of the V-base, on the exterior side. The frame 15 and the pot plate 17 are made of a light metal alloy by die casting. The transition areas from the frame 15 to the pot plate 17 are reinforced by the accumulation of material 18.

The device for guiding cooling air at the frame 15 is implemented by its cross-sectional profile. As illustrated in FIG. 3, the ribs 19 of the frame 15 have a cross-sectional profile in the area of the recesses 10 for this purpose. This cross-sectional profile is suitable for conveying, by means of its rotation (rotating direction 6), air from the brake disc pot 1a in the radial direction toward the outside (flow arrows 7) through the recesses 10 between the brake discs 2a, 2b (FIG. 4). The cross-sectional profile has an acute angle 5, whose vertex 20, viewed in the rotating direction 6 of the brake disc pot 1a, because of the radiuses 21 used at the cross-sectional corners, is situated in front of the cross-sectional profile on a tangent 9 at the inside diameter of the brake disc—arrow 22—, and whose legs 23, 24, viewed from the vertex 20, extend opposed to the rotation direction 6 of the brake disc pot 1a. In the area of the recesses 10, the ribs 19 of the frame 15 have a cross-sectional profile that essentially corresponds to a parallelogram, with the vertex 20 of its lower acute corner angle 5 situated in front in the rotating direction 6 of the brake disc pot 1a, essentially on the inner diameter (arrow 22) of the brake disc pot 1a.

The ribs 19 are skewed at an angle 5 of approximately 45° with respect to the tangent at the inner brake disc pot diameter (arrow 22). The flowing-in of cooling air (arrows 7) from the interior side of the brake disc pot, in the case of the rotating direction (arrow 6) that corresponds to forward driving, is therefore furthered.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake disc pot for a disc brake having at least one brake disc, the brake disc pot comprising:
   a centering device operatively configured for centering and attaching the brake disc;
   a cooling air guide device operatively configured to guide cooling air in a radial direction toward the brake disc; and
   recesses operatively located about a periphery of the brake disc pot, wherein
   the recesses alternate between a first recess having one edge thereof defined by the brake disc and a second recess having all edges thereof defined by the brake disc pot.

2. The brake disc pot according to claim 1, wherein the brake disc pot comprises a frame forming its periphery and the recesses, said frame having an essentially V-shape profile.

3. The rake disc pot according to claim 2, wherein the frame is reinforced by at least one pot plate oriented in a radial direction.

4. The brake disc pot according to claim 3, wherein, at points of the V-shaped profile frame, on one axial side the pot plate is arranged, and at the other axial side the centering device is arranged.

5. The rake disc pot according to claim 3, wherein at least one of the frame and the pot plate comprises a light metal alloy.

6. The brake disc pot according to claim 3, wherein at least one of the frame and the pot plate are cast components.

7. The brake disc pot according to claim 3, wherein transition areas from the frame to the pot plate are reinforced with an accumulation of material of the brake disc pot.

8. The brake disc pot according to claim 2, wherein ribs of the frame have a cross-sectional profile in an area of the recesses, operatively configured to convey air from the brake disc pot in a radial direction outward through the recesses and along or into the brake disc due to rotation of the brake disc pot.

9. The brake disc pot according to claim 8, wherein the cross-sectional profile of the ribs comprises an acute angle whose vertex due to the radiuses used at the cross-sectional corners is situated in front of the cross-sectional profile when viewed in a rotating direction of the brake disc pot, and whose legs, viewed from the vertex, extend in a direction away from the rotating direction of the brake disc pot.

10. The brake disc pot according to claim 9, wherein the vertex is situated on a tangent on an inner diameter of the brake disc pot.

11. The brake disc pot according to claim 8, wherein in an area of the recesses, the ribs of the frame have a cross-sectional profile corresponding to a parallelogram, with a vertex of a lower acute corner angle situated in front of the rotating direction of the brake disc pot.

12. The brake disc pot according to claim 8, wherein in an area of the recesses, the ribs of the frame have a cross-sectional profile having rounded corners.

13. The brake disc pot according to claim 2, wherein for a double disc brake having two brake discs spaced parallel to one another, the V-shape profile extends from one brake disc to the other.

14. The rake disc pot according to claim 13, wherein the frame is reinforced by at least one pot plate oriented in a radial direction.

15. The rake disc pot according to claim 2, wherein the centering device is arranged at points of a V-base of the V-shaped profile of the frame situated on an outer side in the axial direction.

16. The brake disc pot according to claim 1, wherein:
the centering device comprises centering shoulders of the brake disc pot; the brake disc, by way of a plurality of projections oriented toward an interior from an inner diameter of the brake disc, is assembled in an axial direction onto the centering shoulders of the brake disc pot; and
fasteners fix the brake disc to the brake disc pot.

17. The brake disc pot according to claim 16, wherein the fasteners are at least one of screwed connectors and rivets.

18. The brake disc pot according to claim 1, wherein, viewed from the brake disc, the brake disc pot extends essentially in one direction.

19. The brake disc pot according to claim 1, wherein the disc brake is a double disc brake having two brake discs spaced parallel to one another, and wherein the brake disc pot extends between the two brake discs, the cooling air guide device guiding the cooling air into a space between the two brake discs.

20. The brake disc pot according to claim 1, wherein the brake disc pot is operatively configured to center the brake disc in both a radial and an axial direction.

* * * * *